Patented Apr. 25, 1939

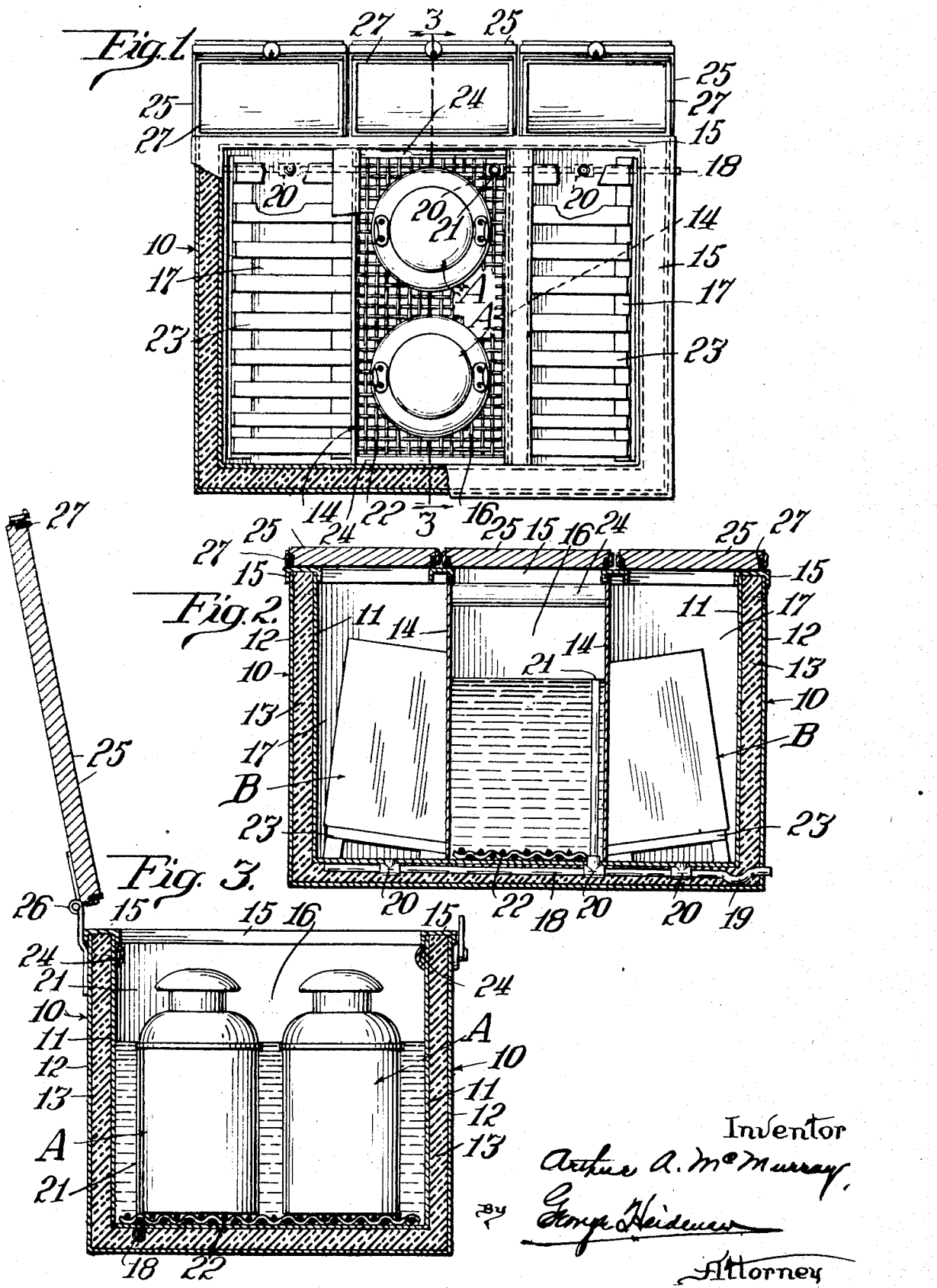

2,155,502

UNITED STATES PATENT OFFICE 2,155,502

MILK COOLING CABINET

Arthur A. McMurray, Norristown, Pa., assignor of one-half to Ronald L. Hectorne, Bridgeton, N. J.

Application February 8, 1937, Serial No. 124,715

5 Claims. (Cl. 62—75)

My invention relates, primarily to a milk cooler or cabinet for use by dairy farmers pending delivery of the milk to the dairy concerns, although it may be used equally as well by others or in connection with other commodities.

My invention has for its object the provision of a cabinet in which the milk, contained in the large standard milk cans, may be quickly cooled and reduced to a low temperature as required by the health departments and the milk companies.

The invention also has for its object the provision of a cabinet whereby the cooling may be accomplished and the low temperature maintained through the use of a minimum quantity of ice due to less frequent need of replenishment than is the case with milk coolers as heretofore constructed and hence the cost of operation is materially reduced.

Another object of my invention is the provision of a cabinet of the character mentioned wherein access to and replacement of the milk holding containers or cans may be had without entailing the excessive or undue heat leak as encountered in cooling cabinets as heretofore constructed; my improved cabinet being constructed to somewhat equalize the temperatures in the respective cooling medium or ice holding compartments.

The foregoing enumerated objects and advantages, as well as other objects and advantages inherent in the invention, will all be more readily comprehended from the following detailed description of the accompanying drawing, wherein:

Figure 1 is a top plan view of my improved cabinet with the covers of the three compartments shown in complete open position; with portions of the floor-racks broken away to show construction therebeneath and showing a pair of milk cans in place.

Figure 2 is a longitudinal sectional elevation with the various covers in closed position and the two end compartments each provided with a block of ice while the maximum water level in the milk can holding compartment is indicated in dotted lines.

Figure 3 is a cross sectional view taken through the milk can receiving compartment, being taken substantially on the line 3—3 of Figure 1 and looking in the direction of the arrows.

The specific embodiment of my invention as illustrated in the drawing comprises a suitable sized cabinet 10, preferably of sheet metal and formed with spaced inner and outer walls 11 and 12, and suitable insulating material 13 therebetween.

The cabinet is shown provided with a pair of transverse walls or partitions 14, 14, integrally united with the inner wall 11 of the cabinet and like the main walls being preferably of sheet metal or temperature conducting material and therefore of single thickness.

The partitions 14, 14 are coextensive with the inner wall and the upper ends of the walls 11 and 12 as well as the partitions 14 are provided with the frame 15 which may extend continuously about the tops of the three compartments to provide a flat cover contacting or supporting surface all arranged in the same horizontal plane as shown in Figure 2. In the exemplification, the two partitions divide the cabinet into a central or milk can holding compartment 16 and two ice holding compartments 17, 17 which latter preferably are of substantially the same dimensions.

The bottom of the cabinet, preferably between the inner and outer walls, is shown provided with an outlet pipe 18, see Figure 2, leading from beneath the ice holding compartment at one end of the cabinet toward the opposite end, at a slightly declining angle and terminating on the cabinet exterior as shown in Figure 2 to constitute a drain pipe for all three compartments; the pipe at the discharge end being formed to provide a water-seal as at 19.

The bottoms of the two ice holding compartments are provided with drain outlets as at 20; while the outlet of the central or milk can holding compartment is provided with an upstanding overflow pipe 21 which is preferably removably screwed into the outlet coupling 20 of the drain pipe 18. The overflow pipe 21 is of predetermined height to maintain the water level in the central compartment 16 beneath the necks or upper ends of the milk cans which are shown at A, A in Figures 1 and 3. With the overflow pipe 21 removably screwed into the outlet coupling, the pipe may be unscrewed to permit complete flushing and cleaning of the central compartment.

The bottom of the central compartment is shown provided with a heavy wire mesh or corrugated metal plate as at 22 to protect the bottom of the compartment and to hold the milk cans A in slight spaced relation with the bottom of the compartment to allow circulation of the cooling medium or water beneath the bottoms of the cans.

The two side or ice holding compartments 17 are shown provided with sloping floor racks or grids 23 which cause the large cakes of ice B to constantly remain in contact with the sheet metal partitions 14 as shown in Figure 2 and hence in maximum temperature transmitting relation.

The upper ends of the two ice holding compartments 17, 17 are arranged in constant communication with each other by means of the air conducting conduits or channels 24, 24, see Figure 3, arranged adjacent the front and rear walls of the cabinet, extending through the upper part of the central or milk can holding compartment; the ends of the conduits being secured in suitable openings in the partitions. These conduits tend to somewhat equalize the temperatures in the two ice holding compartments while at the same time provide additional cooling surface in the upper end of the central compartment.

The cabinet is provided with three covers or lids 25, one for each compartment; the lids being hingedly secured at the rear as at 26 to swing upwardly and being made to rest on the top flat surface of the frame 15; the covers or lids 25 adjacent the edges being provided with some suitable sealing medium such as rubber strips 27. The front ends of the covers or lids may be provided with suitable latches for drawing the lids into snug relation with the top of the cabinet.

Under present regulation, the dairy farmers are required to deliver the milk to the milk companies cooled to a low temperature and, therefore, the milk obtained at both morning and evening milkings must immediately be placed in a suitable cooling chamber.

In practice, the two side compartments 17, 17 are each supplied with large blocks of ice which, by reason of the sloping floor racks or grids, rest up against the partitions 14; while the center compartment 16 is provided with chipped ice or suitable cold conducting medium, such as water, to a point beneath the top of the overflow pipe 21. The milk containing cans A are then immersed in the cooling medium or chipped ice.

I am aware that milk coolers have been used consisting of a suitable size box adapted to receive a milk can holder and ice and provided with a single cover or lid but such coolers not only are less efficient but are quite expensive in operation. As access to the milk cans must be had a number of times a day, it is apparent that with such coolers a rather costly heat leak occurs each time the milk cans are replaced or access to the cans is necessary. With my improved cabinet, after the ice holding chambers or compartments 17 have been properly charged with ice, the respective covers or lids 25 of these compartments are then latched in closed position against ingress of air and are not disturbed during the milk can changing operations, with the result that the great losses heretofore encountered are eliminated. Then too, with the coolers heretofore in use, the cooling medium or water in the milk can holder depended on the cold air in the main box for maintaining low temperature—the cold air being rapidly dissipated with each opening of the cover or lid.

As is evident from my improved construction, the cold air is not allowed to escape from the ice compartments and the conducting medium, namely the water in the central compartment, a better conducting medium than air, will be maintained at a low temperature due to its immediate contact with the metallic partitions with which the large blocks of ice also are in constant contact.

What I claim is:

1. A milk cooling cabinet comprising a receptacle provided with transverse partitions of conducting material and of height coextensive with the height of the walls of the receptacle whereby the receptacle is divided into separate compartments, the intermediate compartment constituting the milk can holding compartment while the compartments at opposite sides constitute ice holding compartments, the latter compartments being without communication with the former compartment, all of said compartments having drain outlets in the bottoms; an air sealed drain pipe common to all of said drain outlets; sloping grids in the bottoms of the ice holding compartments whereby the ice in said compartments is constantly held against said partitions; and a separately operable closure member for each compartment.

2. A milk cooling cabinet comprising a receptacle provided with transverse partitions of conducting material and of height coextensive with the height of the walls of the receptacle whereby the receptacle is divided into separate compartments, the intermediate compartment constituting the milk can holding compartment while the other compartments are ice holding compartments arranged out of communication with the former compartment, the latter compartments having drain outlets in their bottoms while the intermediate compartment has an overflow outlet for maintaining a water level below a predetermined point; a drain pipe in the bottom of the receptacle common to all of said drain outlets and the overflow outlet; and a separate closure member for each compartment.

3. A milk cooling cabinet comprising a receptacle provided with transverse partitions of conducting material whereby the receptacle interior is divided into separate compartments, the intermediate compartment constituting the milk can holding compartment while the other compartments constitute ice holding compartments; means for equalizing the temperatures in the ice holding compartments; drain outlets in the bottoms of all compartments; an overflow tube in the milk can holding compartment for maintaining a water level below a predetermined point; and a separate closure member for each compartment.

4. A milk cooling cabinet comprising an insulated receptacle provided with transverse partitions of conducting material whereby the receptacle interior is divided into separate compartments, the end compartments constituting ice holding compartments and provided with floor racks sloping downwardly toward the partitions, while the intermediate compartment constitutes the milk can holding compartment and is adapted to receive a cooling medium maintained at a relatively low temperature through contact with said partitions; air conducting conduits between the ice holding compartments and disposed through the milk can holding compartment; outlets in the bottoms of the ice holding compartments; an overflow pipe in the milk can holding compartment; a drain pipe common to said outlets and said overflow pipe and adapted to prevent ingress of air; and a separate closure member for each compartment.

5. A milk cooling cabinet of the character described comprising a double walled receptacle provided with sheet metal partitions whereby the receptacle interior is divided into three compartments, the two end compartments constituting ice storage compartments provided with inner bottoms sloping toward the partitions so as to maintain the ice in intimate contact with the metal partitions, the middle compartment being adapted to hold a cooling medium which is maintained at a relatively low temperature through contact with the partitions, said middle compartment being also adapted to have milk holding cans submerged in the cooling medium; a removable grid in the bottom of said middle compartment; air conducting passages between the two end compartments and disposed through the middle compartment; a common water sealed drain for all of said compartments; and a separate cover for each compartment, the covers and the upper walls of each compartment being formed to effect air-tight relation.

ARTHUR A. McMURRAY.